June 5, 1962  E. M. GROSSER  3,037,300
GLOBE
Filed April 19, 1961
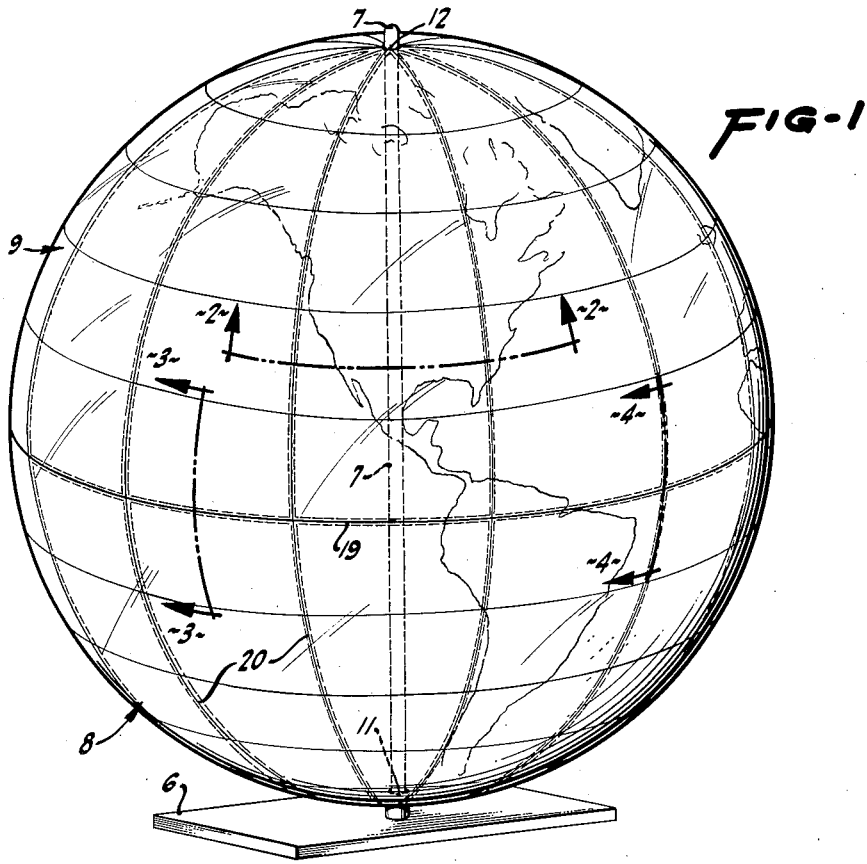
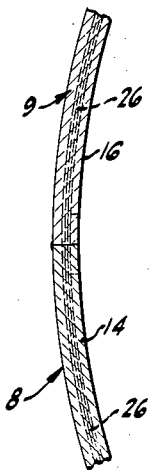
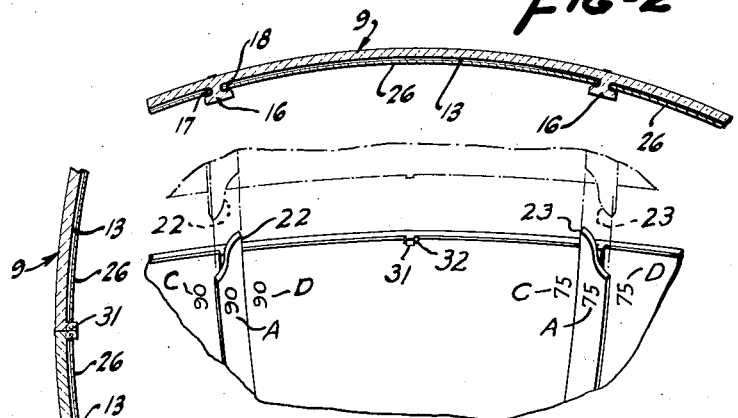
INVENTOR.
EDWARD MORTON GROSSER
BY Lothrop & West
ATTORNEYS

United States Patent Office 3,037,300
Patented June 5, 1962

3,037,300
GLOBE
Edward Morton Grosser, Menlo Park, Calif.
(414 S. Barrington Ave., Los Angeles 49, Calif.)
Filed Apr. 19, 1961, Ser. No. 104,048
4 Claims. (Cl. 35—46)

My invention relates primarily to spheres or globes for general display and for teaching purposes. It is especially concerned with a globe in which the geographical or other features of the earth's surface or of the surfaces of heavenly bodies can be readily displayed. The arrangement is such that the displays can be changed from time to time in order to represent different bodies, or different conditions on the same body or to maintain geographical boundaries up to date.

An object of the invention is to provide a globe which can be kept current and accurate, being maintained so by replaceable display pieces.

Another object of the invention is to provide a globe in which relatively impermanent display pieces are well protected when in position yet are easily changed from time to time.

Another object of the invention is to provide a globe which can readily and inexpensively be manufactured.

Another object of the invention is to provide an improved globe structure.

Other objects of the invention together with the foregoing are attained in the embodiment of the invention described in the accompanying description and illustrated in the accompanying drawings in which:

FIGURE 1 is a perspective of a globe constructed in accordance with the invention, there being shown in place certain display cards of a geographical nature;

FIGURE 2 is a cross section, the plane of which is indicated by the line 2—2 of FIGURE 1;

FIGURE 3 is a cross section, the plane of which is indicated by the line 3—3 of FIGURE 1;

FIGURE 4 is a cross section, the plane of which is indicated by the line 4—4 of FIGURE 1; and FIGURE 5 is a fragmentary elevation showing the relationship of meeting portions of the device.

While the globe pursuant to the invention can be made in a number of different ways, it is particularly useful in the form illustrated herein. In this form there is afforded a mounting of any convenient sort including a base 6 designed to rest on a support and having an axle 7 upstanding therefrom in any appropriate way. Rotatably mounted on the axle is a hollow globe made up of a lower hemispheric shell 8 and an upper hemispheric shell 9 designed to meet at the equator and together constituting substantially a sphere. There is an aperture 11 in the lower shell to accommodate the axle 7 and a comparable aperture 12 in the upper shell for the same purpose. The two shells 8 and 9 or halves of the sphere are substantially identical, with certain exceptions, so that they can be readily fabricated by molding or the like with only a small change in the molds to produce the distinct halves. Both halves are preferably made of a clear plastic or a plastic which is readily molded and is reasonably transparent. The exterior surface is usually made quite smooth but may be slightly rough or otherwise receptive to marking; for example, by grease crayon or pencil. Also, the exterior surface may bear indicia such as meridians of longitude and parallels of latitude, the indicia being provided by printing or by molding in intaglio or relief. In fact, the molding can be such as to represent, as well, the physical configuration of the terrestrial surface, with varying amounts of relief.

The external configuration of both shells is spherical and uninterrupted. The internal configuration is partially defined by an uninterrupted spherical interior surface 13 of the sphere and partially by inwardly directed ribs 14 and 16. These ribs are conveniently T-shaped in cross section and so provide opposing recesses 17 and 18 between each pair of ribs. Conveniently, the ribs are so spaced as to demark meridians, as they are visible from outside the globe. Near the equator, the ribs 14 and 16 bear numbers "A" (such as "75" and "90" in FIGURE 5) progressing sequentially around the globe to represent an arbitrary zero meridian and the degrees of angular distance of the other meridians therefrom. The thickness of the ribs is sufficient so that they are not quite as transparent as the remainder of the shell and so are rendered distinctive from the exterior surface although they produce little or no exterior deviation from the spherical form thereof. If desired, the visible contrast can be emphasized by applied linear indicia 20. The ribs 14 and 16 extend substantially from the equator 19 of the globe to the adjacent pole of the hemispheric shell, converging adjacent the pole.

The upper hemispheric shell 9 and the lower hemispheric shell 8 in meeting at the equator as shown in FIGURE 3 have an interlocking mechanism provided by a plurality of individual fingers 22, one on each rib 14, which are so contoured as to cause the two hemispheric shells to merge smoothly, leaving the separation as an equatorial mark on the exterior and interior surfaces. The fingers 22 on successive ribs 14 alternate in projecting contour to interlock with similarly alternated fingers 23 on the successive ribs 16 so that the assembled shells 8 and 9 do not rotate relative to each other but are held in alignment.

Situated on the interior of each of the hemispheric shells and located conveniently in the segments between adjacent ribs 14 and adjacent ribs 16 are display cards 26. These are conveniently segmental in contour, of a material which can readily be printed when flat and either opaque, transparent or translucent. The material is slightly springy when bent or dished. Each segment is of such size that a properly printed segment can be easily introduced into the space between adjacent ribs 14 or 16 when the globe is disassembled. Each segment can be slid to an accurate final position with the side edges of the segment in tight abutment with the ribs 14 or 16 and lying within the grooves 17 and 18. Each segment is preferably imprinted with a pair of identification members C and D corresponding to the numbers A on the ribs between which it is properly lodged. The upper hemispheric shell and the lower hemispheric shell are both usually fully loaded with such segments. The separated globe is then assembled. Not only are the segments slightly arcuate when in place so that they cannot be dislodged sideways, but also the end edges of the segments adjacent the equator are retained by bosses 31 protruding inwardly from the shell and engaged by correspondingly notched edges 32 of the segments.

When the globe is appropriately assembled, the segments provide a complete map or other representation substantially at the surface of the globe although the easily damaged printed portions on the segments are actually within and are protected by the overlying transparent plastic.

Whenever it is desired to change all of the segments, for example, to show an illustration of the heavens rather than of the surface of the earth, all of the segments can readily be removed, after disassembly of the two hemispheres, and replaced by others. In the event there is a changing geographical boundary, for example, occurring in only one segment, that segment alone can be removed after disassembly of the globe and replaced by a corrected segment. In this fashion the globe can be utilized for various purposes such as teaching geography or astronomy and can easily be maintained in current condition. The segments are relatively cheap to make and easy to utilize since they are mechanically protected. The globe itself, utilizing the ribs 14 and 16 as meridians and the dividing line 19 between the upper and lower hemispheres as an equator, affords the customary representations on the earth's surface.

There has thus been provided a globe useful for observation, teaching or study, one which is versatile, easy to manufacture, economical, and which can be maintained up to date in any particular category or can be changed to illustrate various different categories.

What is claimed is:

1. A globe comprising a base, a shaft upstanding from said base, a pair of transparent hemispherical shells rotatably engaging said shaft, means for interengaging said shells when said shells are in abutment along an equator, means projecting inwardly of said shells along meridians thereof and providing channels, and means bearing indicia observable through said shells and laterally disposed in said channels and substantially abutting along said equator.

2. A globe comprising a pair of transparent hemispherical shells, each of said shells having a polar aperture and being adapted to engage the other of said shells along an equator, means projecting inwardly of said shells and extending from said equator substantially to said polar apertures for demarking meridians, said projecting means being approximately T-shape in cross section to provide channels, and deformable card segments disposed within said shells in contact therewith and extending into said channels, said card segments having indicia thereon in position to be viewed through said shells.

3. A globe comprising a pair of transparent hemispherical shells, each of said shells having a polar portion and being adapted to engage the other of said shells along an equator, means on the interior of said shells for holding said shells in interengagement adjacent said equator, means projecting inwardly of said shells and extending from said equator substantially to said polar portions and contoured to provide facing pairs of channels, and card segments disposed at their edges within said pairs of channels and substantially abutting at said equator.

4. A globe comprising a pair of transparent hemispherical shells adapted to abut each other along an equator, means for holding said shells and being distinctive from the remainder of the shell when viewed from the exterior in abutting position along said equator, means projecting inwardly of said shells, said projecting means being contoured to provide converging and facing pairs of channels, and card segments disposed at their edges within said pairs of channels, said card segments having indicia thereon in position to be viewed through said shells.

References Cited in the file of this patent

UNITED STATES PATENTS 2,228,736    Starworth _____ Jan. 14, 1941

FOREIGN PATENTS 722,772    Great Britain _____ Jan. 26, 1955